Feb. 21, 1961 A. S. McKAY ET AL 2,972,682
RADIOACTIVITY WELL LOGGING
Filed Aug. 10, 1956
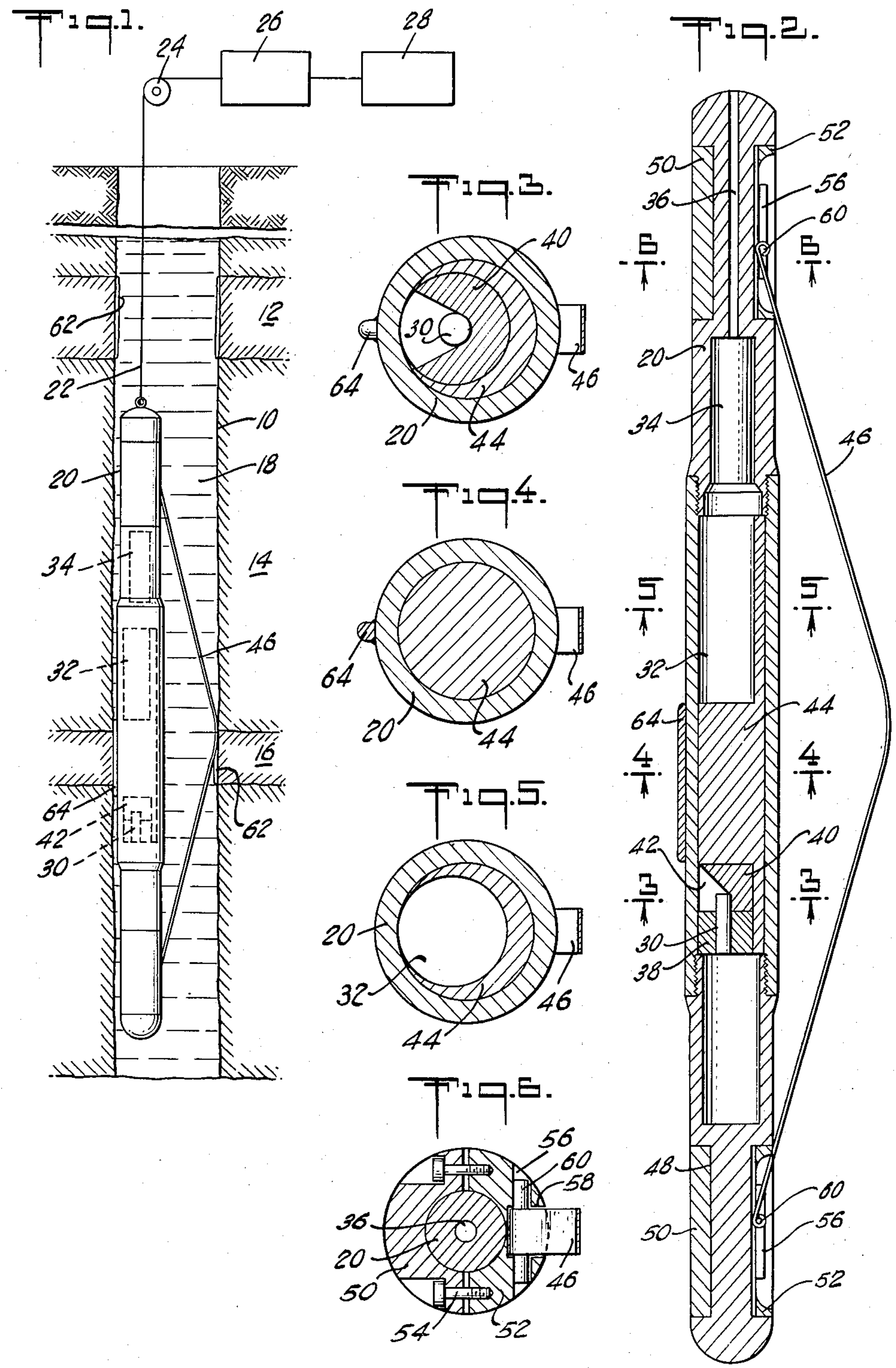

United States Patent Office 2,972,682

Patented Feb. 21, 1961

2,972,682

RADIOACTIVITY WELL LOGGING

Alexander S. McKay, Bellaire, and Ralph C. Reynolds, Houston, Tex., assignors to Texaco Inc., a corporation of Delaware Filed Aug. 10, 1956, Ser. No. 603,316

9 Claims. (Cl. 250—108)

This invention relates to well or borehole logging by methods and means involving the use of radioactivity and more particularly to apparatus for improving the quality of logs obtained with those methods in which a source of radiation is passed through the borehole from which source primary radiation passes outwardly into the formations surrounding the hole to produce secondary radiation therein, some of which passes back to the hole. A detector of the secondary radiation so produced is maintained in the vicinity of and at a fixed distance from the radiation source and the intensity of the secondary radiation detected may be indicative of various characteristics of the subsurface earth formations.

The principal object of the invention is the provision of means for minimizing the detrimental effect on the log of the fluid and mud cake in the borehole, which fluid and mud cake may be present in different amounts depending upon the diameter of the hole, the distance between the measuring instrument and the wall of the hole, and other factors.

As is generally well known, there are several forms of radioactivity borehole logging in which the earth formations are bombarded with primary penetrative radiation to produce or induce secondary radiation, the intensity of which is measured by a suitable radiation detector near the source. Thus, in neutron-neutron logging a source of radiation such as a mixture of radium and beryllium or polonium and beryllium is passed through the borehole, the neutrons from the source being slowed down or thermalized in the surrounding material and formations, some of the slowed scattered neutrons returning to a neutron detector near the source. In neutron-gamma ray well logging a source of neutrons is similarly passed through the hole, the neutrons bombarding the formations reacting with the atoms of the formations to induce gamma rays therein some of which gamma rays pass back into the hole to strike a gamma ray detector near the source. Again, in scattered gamma ray logging a source of gamma rays such as radium, or one of the radioactive isotopes is passed through the hole, some of the gamma rays from the source passing outwardly to penetrate and be scattered within the surrounding formations to return to a gamma ray detector disposed near the source.

In these and other forms of radioactivity well logging the fluid within the borehole usually presents a problem since the resulting log is affected by the amount and kind of the fluid in the vicinity of the radiation source and detector. If the walls of the borehole were uniformly straight and smooth this detrimental effect of the well fluid would not be as great since the logging instrument could be maintained against, i.e., in contact with the wall of the hole while passing therethrough and the primary radiation would pass directly into the earth formation while the secondary radiation would pass more or less directly back into the instrument to strike the detector without having to pass through any appreciable amount of borehole fluid. However, the borehole walls are seldom smooth and straight and the diameter of the hole may vary greatly depending upon such factors as the softness of the earth formations, etc. Again, since drilling mud is used during the drilling of the borehole, certain amounts of the drilling mud solids will frequently adhere to and build up a cake on the wall of the more permeable formations. Thus, even though attempts are made to maintain the logging instrument in contact with the wall of the borehole during the logging operation, when these mud cakes are encountered they hold the instrument away from the borehole wall and when this occurs some of the fluid within the hole fills the space between at least a portion of the instrument housing and the wall. As is well known, the hydrogen in the well fluid and mud cake causes rapid slowing down of many of the fast neutrons from the source and an increase of slow neutron flux at the detector. The hydrogen of the well fluid and mud cake may also cause absorption of the slowed down neutrons with the emission of capture gamma rays. Thus, both the neutron-neutron and the neutron-gamma logs are adversely affected by the presence of the well fluid or mud cake. In a scattered gamma ray log many of the primary gamma rays are scattered within the well fluid so as to be intercepted by the detector without having passed through any of the earth formation itself. In all of these cases the resulting log does not present a true picture of the characteristics of the formation which it is desired to measure if the distance between the sonde and the borehole wall varies.

In certain tests which have been made of scattered gamma ray logging it has been found that in zones of low permeability the porosity values measured with the scattered gamma ray logging instrument agree reasonably well with porosities measured from core samples. On the other hand, in zones of higher permealibity the instrument indicated porosities higher than were found in the core samples. These tests showed that in permeable zones the mud cake on the wall of the borehole holds the instrument housing at a slight distance from the wall and this results in a higher counting rate than would be observed if the instrument remained in contact with the borehole wall at all times. From further experiments it has been determined that about ¼ inch separation between the face of the logging instrument or tool and the wall of the borehole would cause an error of about 10 percent.

In accordance with the present invention spacing means have been provided on the outside of the instrument housing for engaging the borehole wall so as to maintain the sensitive face of the instrument a fixed distance from the side of the hole regardless as to whether or not there is any mud cake present. In a preferred form this means comprises at least one elongated rib or fin extending along the outer surface of the housing parallel to the longitudinal axis of the instrument. This rib may be attached to the instrument housing as by welding, or if desired it may be formed as an integral part of the housing. Preferably the rib extends along the outer surface of the housing betwen the source of radiation and the detector and the rib is thin enough to cut through any mud cake which may be present, particularly on the wall of a permeable zone or formation. It is also preferred that the source and detector be disposed in substantial vertical alignment and somewhat eccentrically of the instrument on the side toward the rib. In other words, the source and detector are not disposed along the longitudinal axis of the instrument housing as in conventional radioactivity logging instruments but are closer to one side, this side thus being the "sensitive side" of the instrument. Means are also provided for pressing the instrument toward the wall of the borehole so that the sensitive face of the instrument will be closest to the wall.

As the instrument is lowered or raised through the borehole the sensitive side will thus be forced toward the borehole wall and the rib will slide along the wall thereby maintaining the outer surface of the instrument at a predetermined distance from the wall. As indicated above, if mud cake is present on the wall of a permeable formation the rib will cut through the mud cake while sliding along the borehole wall and at all times the sensitive side of the instrument, i.e., the side closest to the source and detector will be maintained a fixed distance from the wall. By disposing the source and detector closer to one side of the housing, the length of the path of the radiation from the source into the formation and back to the detector will be minimized and a higher counting rate or detector output will result. Experiments have shown that where the lateral width of the rib is about 5/16 inch, the detrimental effect of variations of the mud cake thickness is kept at a low value and since both the density and the hydrogen concentration of the mud cake are closer to that of the borehole fluid than to that of the rock matrix of the borehole wall, the detector response does not change appreciably when the 5/16 inch layer of borehole fluid is partially or completely replaced by a layer of mud cake, and the variations in the measured detector output will be indicative only of the characteristic of earth formations, such as porosity, which it is desired to ascertain.

For a better understanding of the invention, reference may be had to the accompanying drawing in which:

Fig. 1 is a vertical elevation through a portion of a borehole showing a logging instrument embodying the invention suspended therein;

Fig. 2 is a vertical sectional view through the instrument; and

Figs. 3, 4, 5 and 6 are cross-sectional views through the instrument on the lines 3—3, 4—4, 5—5, 6—6 of Fig. 2 looking in the direction of the arrows.

Referring to the drawing, a borehole 10 is shown as traversing several subsurface formations such as those indicated at 12, 14 and 16. The lower portion of the borehole is shown as filled with well fluid 18 which may, of course, be oil or water or drilling mud with oil or water as the liquid phase.

Shown as suspended within the borehole 10 is a radioactivity borehole logging instrument indicated generally by the elongated housing 20. The instrument 20 is suspended from a conductor cable 22 which passes over a suitable cable measuring reel or drum 24 at the surface and which indicates or records at all times the amount of cable payed out and thus the depth of the instrument 20 in the borehole. The cable 22 passes from the drum 24 to a suitable amplifier 26 and recorder 28, the purposes of which will be described hereinafter.

The instrument 20 is shown in vertical cross section and to a larger scale in Fig. 2. The essential elements contained within the instrument 20 include a source 30 of primary penetrative radiation such as neutrons or gamma rays. Also disposed within the instrument 20 and in vertical alignment with the source 30 is a detector 32 of secondary radiation. It is understood that if a neutron-neutron log is to be made the element 32 will be a neutron detector whereas if a neutron-gamma ray log is to be made the element 32 will be a gamma ray detector responsive to gamma rays induced in the surrounding formations by bombardment by the neutrons from the source 30. Again, if a scattered gamma ray log is to be made the source 30 will be a gamma ray emitter such as a small amount of radium or a radioactive isotope and the element 32 will be a detector responsive to gamma rays originating in the source 30 and scattered within the surrounding formation back to the borehole. The detector 32 may be connected by leads, not shown, to a preamplifier 34 from which the output passes through leads in the opening 36 to the lower end of the cable 22 and from there to the amplifier 26 and recorder 28 at the surface. It will be noted that the source 30 and the detector 32 are disposed eccentrically to the longitudinal axis of the instrument 20 and as shown in the drawing are closer to the left-hand side of the instrument housing 20 than to the opposite side.

The lower portion of the source 30 is shown as surrounded by a mass 38 of a high atomic number metal such as lead for absorbing radiation and the upper portion of the source is partially surrounded by a mass of gamma ray absorptive metal 40 such as the machinable tungsten alloy known as "Mallory 1000." As is illustrated more clearly in Fig. 3 the absorber or shield 40 is provided with a collimating slot or opening 42 toward the left side of the instrument as viewed in Fig. 2.

The source 30 and detector 32 are separated by another mass 44 of gamma ray absorptive material such as lead and a portion of this shield extends upwardly around the sides and back of the detector 32. Preferably the shield 44 also extends downwardly around the sides and back of the shields or absorbers 40 and 38 as shown more clearly in Fig. 3. As shown more clearly in Fig. 5 the upper and lower extensions of this shield 44 are somewhat crescent-shaped in cross section.

Means are provided for pressing the logging instrument toward the wall of the borehole with the sensitive side of the instrument, i.e., the side shown at the left in the drawing, closest to the hole wall. This means comprises a flat spring member 46 permanently bowed outwardly at its center portion, both ends of the spring having sliding engagement with opposite ends of the instrument housing. As shown in Fig. 1 the bowed portion of the spring engages the hole wall and the spring thus tends to press the instrument uniformly toward the opposite side of the wall.

As is illustrated in Figs. 2 and 6 a portion of the instrument housing 20 near each end thereof is cut away as indicated at 48 to form an elongated circular groove. A pair of clamping elements 50 and 52 fit snugly within the groove 48 and are drawn together by means of the screws or bolts 54. The clamping section 52 is provided throughout its length with slots 56 and 58. The slot 58 is slightly wider than the spring 46 and the slot 56 is slightly larger than a pin 60 extending through and affixed to an end of the spring 46. It will thus be seen that the pin 60 will slide along the slot 56 while the spring 46 will have free movement within the slot 58. The spring 46 is preformed or bent so that if nothing tends to press the bowed portion of the spring toward the instrument housing 20 the pins 60 will rest in the slots 56 at their innermost ends, i.e., toward the center of the instrument. When the instrument is lowered into the borehole, however, the bowed portion of the spring will engage the wall of the hole and will be compressed more or less toward the instrument housing 20 whereupon the pins 60 will slide along the slots 56 toward the outer ends of the instrument. In this manner the logging instrument will at all times be pressed against the borehole wall with its sensitive side closest to the wall.

As has been stated hereinbefore, the drilling mud solids tend to be deposited on the borehole wall opposite permeable formations. Thus, assuming that the formations 12 and 16 are considerably more permeable than the formation 14, a mud cake 62 will in all probability be present along that portion of the borehole wall opposite the formations 12 and 16. Experiments have shown that where the logging instrument is cylindrical with a smooth outer surface these mud cakes 62 will hold or force the instrument away from the borehole wall at times when the instrument is opposite the more permeable formations. When this happens a quantity of the borehole fluid 18 will occupy the space between the instrument and the borehole wall and the number or intensity of the detected neutrons or gamma rays will be affected thereby and an incorrect log will result. As has been stated hereinabove, even a 1/4 inch layer of drilling fluid has been found to make as much as a 10 percent difference in the measured gamma ray intensity when making a scattered gamma ray log.

To overcome this adverse effect of the borehole fluid an elongated rib or fin 64 is attached to or formed integrally with the instrument housing 20 in such a way that it extends longitudinally along the outer surface of the housing preferably between the radiation source 30 and the detector 32. It has been found that a rib about 5/16 inch thick, i.e., between the housing and the borehole wall is quite satisfactory. The upper and lower ends of the rib 64 may be slightly curved as shown in Fig. 2.

When the instrument is being lowered or raised through the borehole the rib 64 will engage the walls of the hole in the non- or lesser permeable formations such as that at 14 and will maintain the instrument at a distance from the hole wall of, say, 1/4 inch or 5/16 inch. When the instrument is being passed through the borehole and the portion of the instrument opposite the source 30 and detector 32 approaches a mud cake such as is shown at 62 in formation 12 the rib 64 will cut through the mud cake and will contact the harder surface of the formation 12 under the mud cake, thus still maintaining the instrument at the same distance from the wall of the hole as when the instrument is opposite the formation 14. Since, then, the amount of borehole fluid between the sensitive face of the instrument and the borehole wall will remain substantially constant at all times, the effect of this borehole fluid can be neglected and the variations in the detector output will depend only on the intensity of the secondary radiation which has passed through the earth formation. Thus, if for example a scattered gamma ray log is being run in order to determine the porosity of the various earth formations the recorded detector output or log will be a true indication of the porosities since the borehole fluid will have no detrimental effect.

By disposing the source 30 and detector 32 closer to one side, i.e., the sensitive side of the instrument housing, the path of the primary and secondary radiation through materials other than the earth formations will be minimized. Again, by so disposing the source and detector sufficient space is left at the back side of the instrument so that the additional shielding or radiation absorptive material 34 can be extended into this space. Because of the shape of the shield 40 and the upper and lower extensions of the shield 44 the amount of primary radiation passing outwardly into the borehole in directions other than through the sensitive face of the instrument will be minimized and the amount of secondary radiation which might strike the detector 32 from directions at the back or sides of the detector will also be minimized.

As a result of the features of the invention which have been described, the log which is obtained will provide a much truer indication of the characteristic of the earth formations being measured than in the conventional logging instrument.

Obviously, many modifications and variations of the invention as hereinabove set forth may be made without departing from the spirit and scope thereof and therefore only such limitations should be imposed as are indicated in the appended claims.

We claim:

1. A well borehole logging assembly comprising an elongated housing adapted to be lowered and raised in a borehole while suspended from a conductor cable, a source of penetrative radiation within said housing, a detector of secondary radiation within said housing and in alignment with said source, said detector and said source being disposed closer to one side of the housing than to the opposite side, means for forcing said housing laterally toward the borehole wall so that said one side will be closer to the wall than the opposite side, and spacing means projecting radially outwardly from said one side of the housing and adapted to engage and slide upon said wall to maintain the outer surface of said one side of the housing a predetermined fixed distance from said wall, the sensitive area of said detector facing toward said one side being substantially larger than the area of any portion of said spacing means interposed between said detector and said wall, whereby radiation reaching the detector on said one side passes through the region defined by the fixed distance between said one side of the housing and the wall of the bore hole including any mud cake on said wall without a significant portion of said radiation passing through said spacing means en route to said detector.

2. A logging assembly as described in claim 1 in which said spacing means comprises an elongated rib attached to the outer surface of said housing and extending longitudinally along at least that portion of said one side of said housing between said source and said detector, said rib being adapted to cut through any mud cake present on the wall of the borehole and, by sliding along said wall as the assembly passes through the hole, to maintain said portion of the housing spaced a predetermined distance from the wall of the borehole.

3. A well borehole logging assembly comprising an elongated housing adapted to be lowered and raised in a borehole while suspended from a conductor cable, a source of penetrative radiation within said housing, a radiation absorption shield substantially surrounding said source and provided with a collimating slot extending from said source radially outward toward one side of said housing, a detector of secondary radiation within said housing and in alignment with said source, said detector being disposed closer to said one side of the housing than to the opposite side, the arrangement being such that primary radiation from said source will pass through said slot and said one side of said housing into the earth formation nearest to said one side to produce secondary radiation therein some of which will enter said housing through said one side to strike said detector, means for forcing said housing laterally toward the borehole wall so that said one side will be closer to the wall than the opposite side and means projecting radially outwardly from said one side of the housing and adapted to engage said wall and maintain the outer surface of said one side of the housing a predetermined fixed distance from said wall, the sensitive area of said detector facing toward said one side being substantially larger than the area of any portion of said spacing means interposed between said detector and said wall, whereby radiation reaching the detector on said one side passes through the region defined by the fixed distance between said one side of the housing and the wall of the bore hole including any mud cake on said wall without a significant portion of said radiation passing through said spacing means en route to said detector.

4. A logging assembly as described in claim 3 in which said projecting means comprises a rib attached to and extending longitudinally along at least a portion of said housing, said rib being adapted to cut through any mud cake present on the formation wall and to slide along the wall itself.

5. A logging assembly as described in claim 3 in which said forcing means comprises a flexible, resilient bow spring disposed longitudinally along the outer surface of said housing opposite said one side, each end of said spring having longitudinally sliding engagement with said housing and the center of the spring being adapted to slide along the wall of the borehole opposite said one side of the housing.

6. A logging assembly as described in claim 3 in which said detector is cylindrical in horizontal cross section and is disposed within said housing eccentrically to the longitudinal axis of the housing.

7. A logging assembly as described in claim 6 including an elongated radiation shield member, crescent-shaped in horizontal cross section, surrounding the sides and back of said detector opposite said one side of the housing.

8. A logging assembly as described in claim 3 in which said source is a source of gamma rays and said detector is adapted to respond to gamma rays from said source which are scattered in the surrounding earth formation and returned to the borehole.

9. Apparatus adapted to be passed through a bore hole for conducting a log of the earth formations traversed by the bore hole comprising an elongated instrument housing containing a source of gamma radiation, a detector of scattered gamma rays resulting from said source, a gamma ray shield positioned intermediate the source and the detector for preventing gamma rays from passing directly from the source to the detector, means for continuously urging a sensitive face of the elongated instrument housing against the side of the bore hole, gamma ray shielding means substantially surrounding said source and provided with an aperture facing the sensitive side of the instrument for directing gamma rays into the earth formation while reducing stray gamma radiation in the bore hole, means comprising a gamma ray shield substantially surrounding the portion of said detector remote from the sensitive side of the instrument for preventing stray gamma radiation in the bore hole from reaching the detector, and means comprising a relatively thin elongated rib-like structure extending along the sensitive face of said instrument between the source and detector adapted to cut through any mud cake present on the formation defining the wall of the bore hole for maintaining the outer surface of the sensitive face of the housing a substantially constant predetermined distance from the wall of the bore hole as the housing is moved therethrough, the area of said detector facing the sensitive face of said instrument being substantially larger than any portion of the relatively long rib-like structure which may extend between the detector and the side of the bore hole against which the instrument is urged, whereby substantially all of the radiation reaching said detector by passing through the region between said side of the bore hole and the sensitive face of the instrument may do so without passing through said rib-like structure.

References Cited in the file of this patent

UNITED STATES PATENTS

| | | |
|---|---|---|
| 2,334,475 | Claudet | Nov. 16, 1943 |
| 2,469,461 | Russell | May 10, 1949 |
| 2,711,482 | Goodman | June 21, 1955 |
| 2,769,918 | Tittle | Nov. 6, 1956 |